United States Patent [19]

Koschlig et al.

[11] Patent Number: 4,833,115
[45] Date of Patent: May 23, 1989

[54] CERAMIC HONEYCOMBED ELONGATED CATALYST CARRIER AND METHOD FOR PRODUCTION OF SAME

[75] Inventors: Hans-Joachim Koschlig; Walter Hartmann; Martin Heumüller; Willi Kunkel, all of Bochum, Fed. Rep. of Germany

[73] Assignee: Dr. C. Otto Feuerfest GmbH, Bochum, Fed. Rep. of Germany

[21] Appl. No.: 98,257

[22] Filed: Sep. 18, 1987

[30] Foreign Application Priority Data

Sep. 19, 1986 [DE] Fed. Rep. of Germany ....... 3632322

[51] Int. Cl.$^4$ .......................... B01J 21/04; B23B 3/12
[52] U.S. Cl. .................................. 502/439; 502/527; 428/116
[58] Field of Search ................. 502/527, 439; 428/116

[56] References Cited

U.S. PATENT DOCUMENTS

| | | | |
|---|---|---|---|
| 1,818,403 | 8/1931 | Joseph | 502/527 |
| 3,930,522 | 1/1976 | Turner | 138/111 |
| 4,042,738 | 8/1977 | Gulati | 502/527 |
| 4,253,992 | 3/1981 | Soejima et al. | 502/527 |
| 4,294,806 | 10/1981 | Abe et al. | 502/527 |
| 4,324,701 | 4/1982 | Honda et al. | 252/477 R |
| 4,358,428 | 11/1982 | Fujita et al. | 423/239 |
| 4,448,833 | 5/1984 | Yamaguchi et al. | 428/116 |
| 4,451,517 | 5/1984 | Inoguchi et al. | 428/116 |
| 4,455,336 | 6/1984 | Ogawa et al. | 428/116 |
| 4,608,361 | 8/1986 | Kanamori et al. | 502/527 |
| 4,695,301 | 9/1987 | Okajima et al. | 502/527 |

FOREIGN PATENT DOCUMENTS 1402206 8/1975 United Kingdom .

OTHER PUBLICATIONS

"Die physikalischen und chemischen Grundlagen der Keramik", Horst Scholze, 1968.

Primary Examiner—H. M. S. Sneed
Assistant Examiner—Chung K. Pak
Attorney, Agent, or Firm—Thomas N. Ljungman

[57] ABSTRACT

A ceramic catalyst carrier has a honeycombed structure which comprises a plurality of elongated parallel preferably square channels and thin, porous walls. The thickness of the walls is between 0.4 mm and 1.2 mm. The open cross-sectional area of the channels is greater than 80% of the total cross-section of the carrier body. Besides an intended low primary porosity, a secondary porosity is produced by an opening material. The pores of the secondary porosity which enlarge the active surface for the catalyst show a selected pore size distribution curve with negative skewness and a modal value ranging from 4,000 nm to 60,000 nm. The total true porosity amounts preferably between 50 and 70 Vol. % of the ceramic, whereby the ratio between total and secondary porosity is in the range of 1:1 to 6:1. By ceramic fibres the mechanical strength of the thin walls of the soft green clot and of the fired porous structure can be improved. According to the process the compounds are mixed to achieve a certain plasticity, aged and extruded to form a honeycombed structure which is thereupon dried and fired.

12 Claims, 4 Drawing Sheets

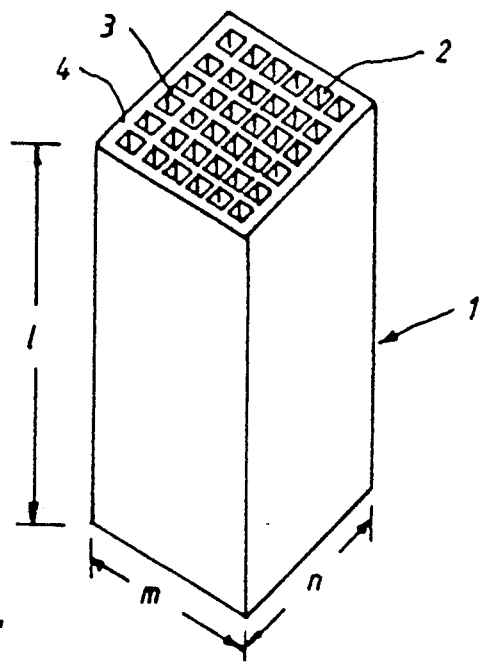
FIG. I.
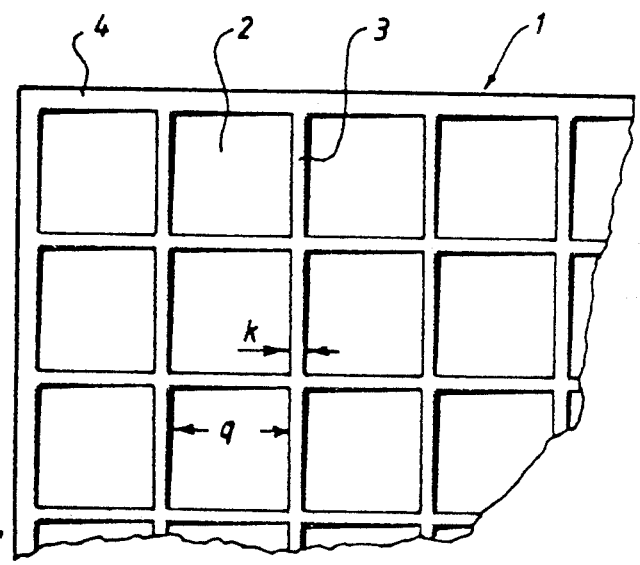
FIG. 2.

$P_d$ = Diameter of secondary pores
PV = Vol.% of secondary pores per pore diameter

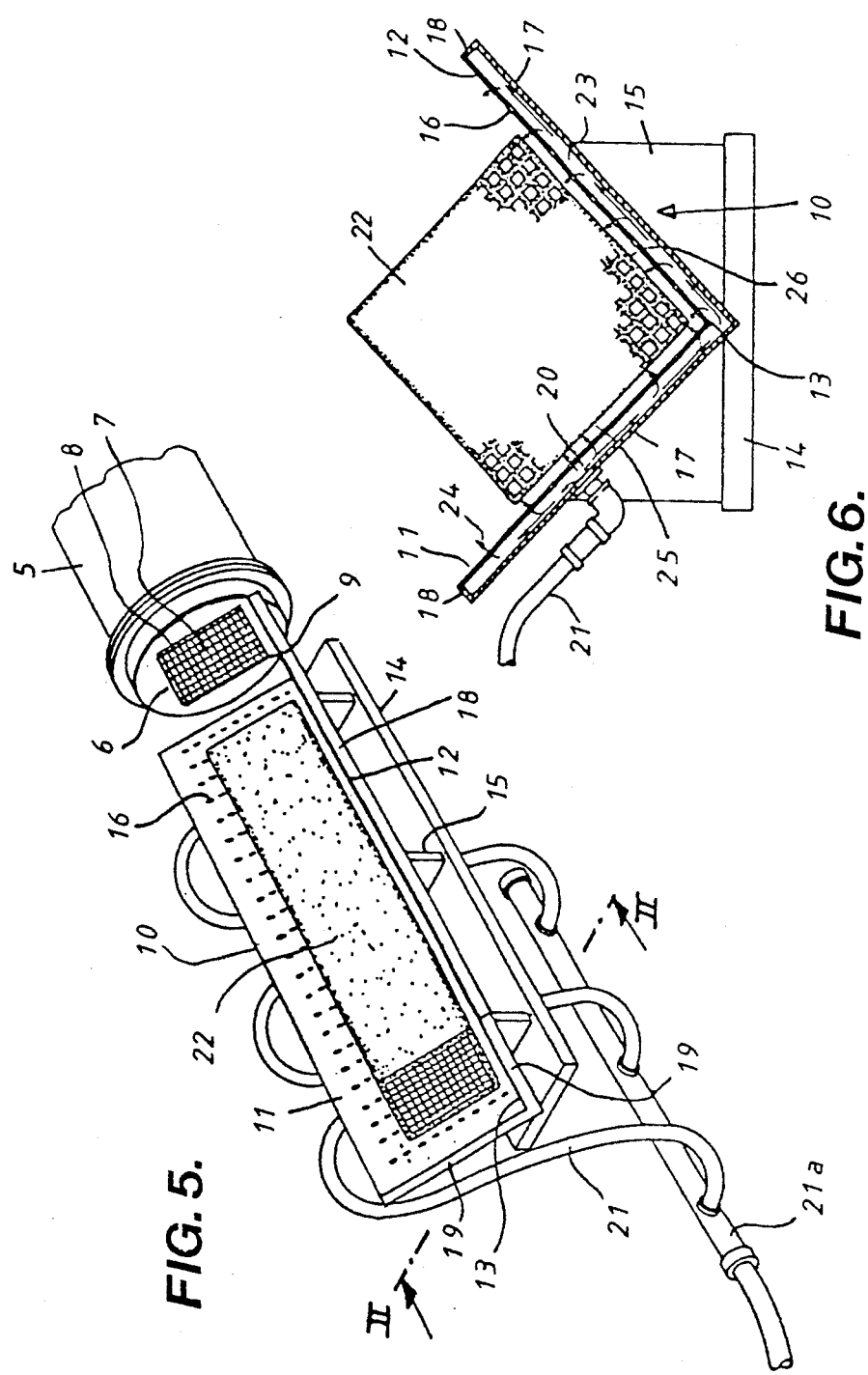
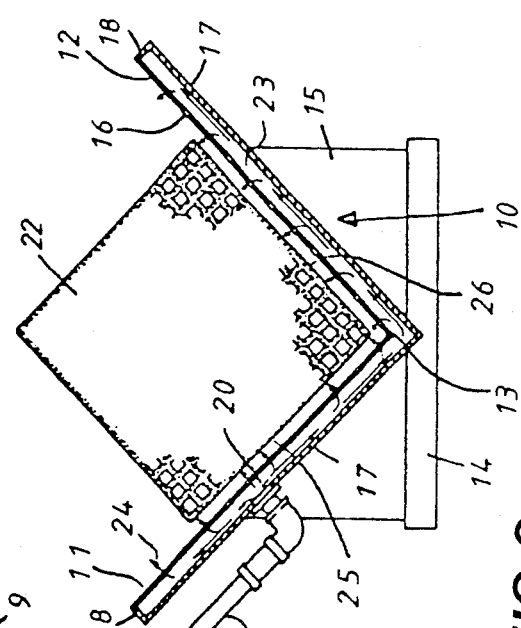
FIG. 5.
FIG. 6.

CERAMIC HONEYCOMBED ELONGATED CATALYST CARRIER AND METHOD FOR PRODUCTION OF SAME

BACKGROUND OF THE INVENTION

1. Field of the Invention

The present invention relates to a thin-walled ceramic honeycombed elongated catalyst carrier which is to be provided with a suitable catalyst particularly for removing nitrogen oxides from flue gases from industrial power and heating plants.

The present invention also relates to a method for the production of an elongated honeycombed ceramic catalyst carrier with a selected high porosity of the ceramic material and low flow resistance for the waste gases or other fluids to be treated.

2. Description of Prior Art

In the British Patent Specification No. 1 402 206 corresponding to German Specification No. 22 10 438 a ceramic catalyst carrier is described which has parallel passages or channels for fluids. The ground mass of aluminium oxide and/or magnesium oxide and/or titanium dioxide and/or activated alum earth and/or quartz comprises up to 10% graphite as opening material which results in secondary pores when the structure is fired. About 30 channels per square centimeter or more are formed by pressing pins into a compressed block of green material giving a total open cross-sectional area ranging from 30 to 50% of the total cross-sectional area, and a total porosity of up to 60% is expected. However, because of the low open cross-sectional area of the channels and their very small diameters these ceramic catalyst carriers show a high flow resistance and the channels may be blocked by particles in a flue gas so that there is no advantage from the porosity.

In the German Patent Specification No. DE-PS 26 58 539 (corresponding to U.S. Pat. No. 4,358,428 of Fujita et al.) a honeycomb-shaped catalyst for removing of nitrogen oxides is proposed having a total open cross-sectional area ranging from 50 to 80% of the total cross-sectional area. According to an example the catalyst consists of a cordierite-ceramic structure. Obviously no secondary porosity for an enlarged surface area of catalyst is used here. Further in the German Patent Specification No. DE-PS 3 046 921 square structures of not specified material having square channels are combined to a bundle.

Another honeycombed catalyst carrier with a plurality of channels of preferably circular cross-section made by extrusion from a ceramic material such as cordierite is known from published German Patent Application No. DE-OS 2 421 311 (corresponding to U.S. Pat. No. 3,930,522 of C. L. Turner). However, here again the channels have a narrow diameter and the total open cross-sectional area of this structure is less than 55% of the total cross-sectional area.

SUMMARY OF THE INVENTION

It is an object of the invention to provide an improved ceramic carrier for catalysts for removing particularly nitrogen oxides from flue gases. It is a further object of the invention to provide a method for producing a thin-walled honeycombed elongated ceramic carrier structure for catalysts with low flow resistance and enlarged active surface for contacts between the catalyst and the parts of the fluid by a selected porosity.

The term "honeycombed" used herein means a structure with a plurality of parallel channels, passages or open cells of circular or polygonal and preferably of square cross-sections separated from each other by thin walls.

According to the invention the elongated ceramic catalyst carrier structure has a total open cross-sectional area of the channels for the flue gases which is greater than 80% of the total cross-section of the ceramic structure, and the thin walls have a thickness in the range of about 0.4 mm to 1.2 mm whereby the channels have preferably a square cross-section with the length of the square ranging from 8 to 10 times the thickness of the walls between the channels. These dimensions result in a honeycombed structure having very low flow resistance to waste gases and other fluids. Whereas most of the ceramic materials show some porosity with pores of very small diameter e.g. because of water escaping during heating, according to the invention the amount of this primary porosity is kept as low as possible, but a secondary porosity is provided which is caused by the addition of at least one fine-grained, organic opening material to the mixture and gasifying this organic opening material by firing. The diameter of the larger pores of this secondary porosity is selected to enlarge the active surface of the catalyst on the ceramic carrier and to provide for small volumes open to the channels into which catalyst substances can be stored and maintained for a long time. Though the ceramic carrier is thin-walled and porous it proved sufficient mechanical strength and thermal-shock resistance when arranged groupwise in waste-gas flues. However, anorganic fibres may be incorporated in the ceramic material to further improve the strength of the walls.

The invention further provides a method to produce the elongated honeycombed ceramic carrier by mixing selected compounds and extruding the soft mixture in the cross-sectional shape of the carrier structure whereby the extruded structure of the green clot is maintained and supported, as is described later, to avoid any deformation by its own weight or by sliding or supporting means or conduits.

BRIEF DESCRIPTION OF THE DRAWINGS

FIG. 1 is a schematic perspective view on a ceramic honeycombed elongated catalyst carrier showing a front side with the frontal ends of a plurality of parallel channels and two outer side walls.

FIG. 2 is a schematic top plan view of a corner area of the ceramic carrier according to FIG. 1.

FIG. 5 is a schematic persepctive view showing the extruder die, an extruded green clot, a V-shaped conduit with a system for providing an air cushion supporting the green clot in the conduit.

FIG. 6 is a schematic cross-sectional view according to II—II in FIG. 5 which shows how air is conducted through openings in the walls of the V-shaped conduit against the green clot so that the lower outer walls of the green clot do not directly rest on the walls of the conduit.

DESCRIPTION OF PREFERRED EMBODIMENTS

In accordance with the invention a ceramic honeycombed elongated catalyst carrier and a method for production of said catalyst carrier is provided. Said catalyst carrier 1 (see FIGS. 1 and 2) consists of a plurality of elongated parallel channels 2 extending in a longitudinal direction of the catalyst carrier structure. These channels are separated from each other by a plurality of inner walls 3 having a thickness k from 0.4 to 1.2 mm and being covered by an outer wall 4. Preferably the thickness of the inner walls is in the range of 0.5 mm to 0.8 mm. The total open cross-sectional area of the channels is greater than 80% of the total cross-sectional area of the catalyst carrier. The ceramic material of the catalyst carrier has a total true porosity of 30 to 70% by volume. The total true porosity consists of small pores formed e.g. by escaping water during firing, herein termed as primary pores giving a primary porosity, and of larger pores by gasification of an organic opening material, herein termed as secondary pores giving a selected secondary porosity. The ratio of said total true porosity to said secondary porosity ranges from 1:1 to 6:1.

The cross-sectional area of individual channels as well as of the whole catalyst carrier is preferably squared. The square length q of a channel is 8 to 10 times the thickness k of an inner wall. The square length m,n of the catalyst carrier ranges from about 100 mm to 300 mm. The length l of the catalyst carrier ranges from 300 mm to 2,000 mm.

The ceramic material of the catalyst carrier comprises mainly cordierite giving a primary porosity of 10% to 20% or mainly mullite giving a primary porosity of 4% to 12% or stone ware or consists of a mixture of cordierite, mullite, stone ware, and alumina. In any case, the primary porosity should be as low as possible, according to the applied material.

The ceramic material of the catalyst carrier may further comprise anorganic fibres to increase its mechanical strength. These anorganic fibres can amount from 3 wt% to 5 wt%. The fibres have a length ranging from 0.5 mm to 50 mm and a thickness ranging from 0.002 mm to 0.02 mm. The material of the anorganic fibres is either rockwool or cordierite or mullite or a mixture thereof. For special applications also fibres of some glassy material may be used. In this case the glass fibres serve partly as a reinforcing material as well as a pore forming material which gives additional secondary pores because of resorption of these fibres to the ceramic material during firing. The increase of strength by fibres is advantageous for the soft green clot as well as for the fired structure.

Figure 3:
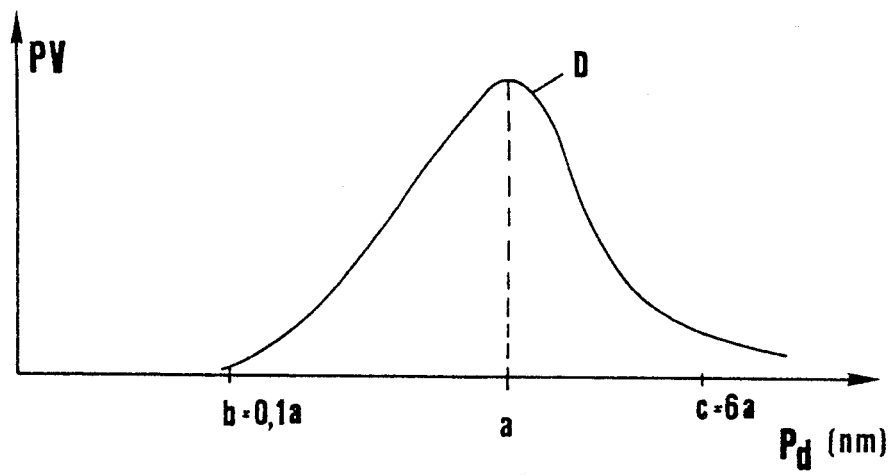
FIG. 3 is a simplified diagrammatic curve of the distribution of pores of the secondary porosity showing the amount of pores in percent of pore volume versus the diameter of the pores, whereby the diameter of the pores is shown on a logarithmical scale.

It is to be understood that the secondary pores considerably increase the active surface area of the catalyst which is covering the sides of the channels and the secondary pore surface or which is enclosed in the secondary pores. Therefore according to the invention it is especially advantageous to produce a secondary pore distribution with a relative high amount of small secondary pores. This is accomplished by a special distribution curve D (see FIG. 3) for the relative amount of secondary pores PV versus to secondary pore diameters Pd. This distribution curve is of an unsymmetrical bell-shaped form with negative skewness.

For this type of distribution curve more than 50% of the secondary pores is smaller than the modal value a of the distribution curve. The modal value a ranges from 4,000 nm to 60,000 nm, especially from 7,000 nm to 30,000 nm. Below $b=0.1$ times the modal value a essentially no secondary pores exist and above $c=6.0$ times the modal value a the relative amount of secondary pores is less than 5% to 10%.

The primary pores have diameters which are smaller than $b=0.1$ times the modal value a of the distribution curve D for the secondary pores, essentially the primary pore diamters are in the range of 10 nm to 3,000 nm.

The total true porosity which is formed by said secondary and said primary porosity is in a ratio to the secondary porosity ranging from 1:1 to 6:1 and especially the total true porosity is in the range of 50% to 70% with a bulk density of the ceramic material of 1.8 $g/cm^3$ to 1.0 $g/cm^3$. In preferred embodiments the ratio between the total true porosity and the secondary porosity ranges from 1:1 to 2:1 and the total true porosity is more than 50 Vol.%.

DESCRIPTION OF PREFERRED PROCESS

Figure 4:
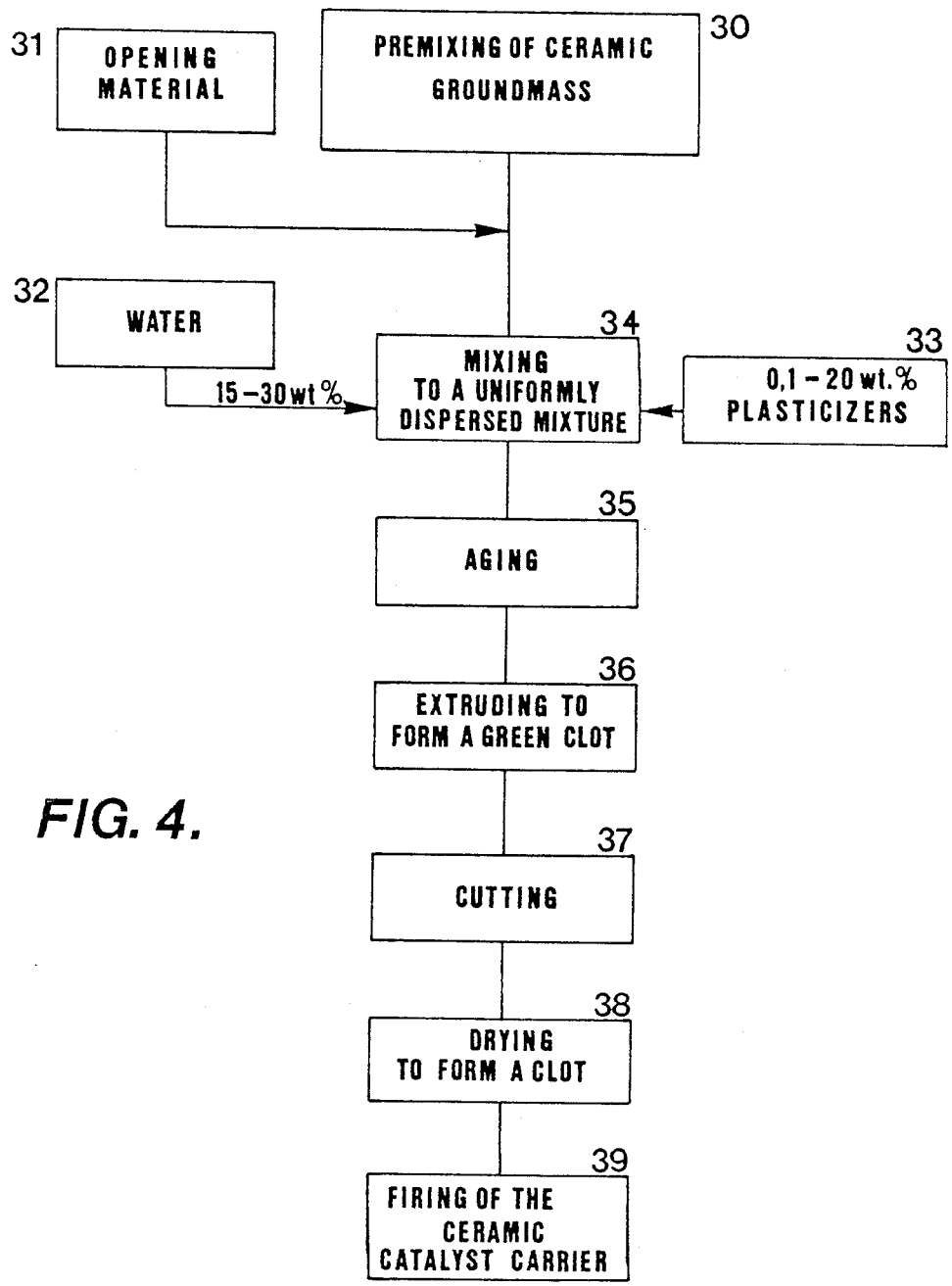
FIG. 4 is a schematic diagram to show the several subsequent steps of the method for production of the catalyst carrier.

The method for the production of said catalyst carrier comprises (see FIG. 4) processing 30 ceramic raw materials which result in a mineral comprising one or more of the compounds cordierite, mullite, stone ware, and alumina, to form a ceramic or refractory ground mass, adding an organic opening material 31 to produce secondary pores later by firing, and further adding 34 water 32 and plasticizers 33, and mixing the composition to a substantially uniformly dispersed mixture. The amount of water ranges from 15 wt.% to 30 wt.% with respect to 100 wt.% dry ceramic material and the amount of plasticizers is in the range of 0.1 wt.% to 20 wt.% adjusted to give a plasticity of the mixture for extrusion of 25 to 27 determined according to the method of Pfefferkorn. This value for the plasticity is the ratio H/h of the height (H=44 mm) of a test cylinder of 33 mm diameter to the height h after deformation of the test cylinder by a disc of 1,192 g of weight falling from a height of 18.6 cm on the test cylinder.

Mixing 34 is followed by aging 35 and afterwards extrusion 36 of the mixture to form the structure of the ceramic catalyst carrier as a thin-walled green clot which hereafter is cut 37 and dried 38.

The clot is fired 39 to obtain a ceramic catalyst carrier with a low amount of primary porosity, with secondary pores which are formed by burn out of the organic opening material, herein termed as gasification of said opening material, with a ratio of the total true porosity of 1:1 to 6:1 and with a total open cross-sectional area of more than 80% of the total cross-sectional area.

As the secondary pore size distribution is related to the grain size distribution curve of the organic opening material the letter has to be similar to the secondary pore size distribution curve D wherein more than 50% of grains are smaller than the modal value of the grain size and the actual grain sizes are adjusted to give the distribution curve D for the relative amount of secondary pores as described earlier (see FIG. 3). The resulting pores are smaller than the originally included particles of the opening material because of sintering of the ceramic or refractory material. As organic opening material preferrably petrol coke is used.

The elongated green clot 22 is extruded (see FIGS. 5, 6) through an extrusion die 6, perferably of an auger machine, with perpendicular slots 7, 8 one corner 9 of which is directed vertically downwards, in a horizontal direction on an conduit 10 with inner walls inclined by 45° to the vertical plane extending in the direction of extrusion. By the position of the extrusion die 6 the walls of the parallel channels are inclined by 45° with respect to any vertical plane one can imagine running in the direction of the extrusion as can be taken from FIGS. 5 and 6. The conduit 10 is V-shaped including an angle of 90° at the longitudinal edge 13 between the inner faces 11, 12 and further consists of longitudinal faces 18, front and back faces 19 and outer faces 17. The inner faces 11, 12, have openings 16 and at least one outer face 17 has an opening 20 for supply of pressurized air through conducts 21, 21a to form an air cushion by flow of air 24 through the cavity 23 and the opening 16 as pointed out between the outer side walls 25, 26 of the green clot and the inner faces 11, 12 of the conduit 10. The conduit 10 is supported by rests 15 on a horizontal base plate 14.

EXAMPLE 1

A ground mass was mixed from 30 wt.% compounded clay, 35 wt.% chamotte, which was milled to a particle size of less than 0.1 mm and 35 wt.% of a MgO containing material such as steatite. Based on the 100% dry ground mass mixture 40 wt.% petrol coke as pore-forming material was added in a particle size which causes a modal value of the pores after firing of 8,000 nm. Further 27 wt.% water and 4 wt.% plasticiser such as lignosulphonate are uniformly dispersed in the mixture. The mixture was aged during 4 days. Before the extrusion the plasticity was adjusted to a value of 27 according to Pfefferkorn by squeezing and the mass was extruded to a green clot with a total cross-section of 150×150 mm and cut to a length of 1,000 mm. The square channels had a cross-section of about 6.75×6.75 mm and the thickness of the thin walls of the fired honeycombed structure was 0.7 mm, resulting in an open cross-sectional area of more than 80%. The soft green clot rested a few minutes on the air cushion of the V-shaped conduit, and then was dried for about 54 hours and fired for about 10 days, whereby the maximum firing temperature was 1320° C. The total true porosity of the ceramic material was 54 Vol.%, the ratio between the total true porosity and the secondary porosity was 1.3:1, and the bulk density was 1.25 g/cm$^3$. After firing the ceramic material comprised more than 60 wt.% cordierite and less than 30 wt.% mullite.

EXAMPLE 2

The process of example 1 was amended with respect to the amounts of opening material and water. 20 wt.% petrol coke and 20 wt.% water was added. A plasticity of 25 according to Pfefferkorn was achieved. The total true porosity was 40 Vol.%, the bulk density 1.54 g/cm$^3$, and the ratio between total true porosity and secondary porosity 2:1.

EXAMPLE 3

In a process similar to example 1 the ground mass was composed by 38 wt.% compounded clay, 37 wt.% alumina and corundum and 25% mullite and mullite raw material. Further 20 wt.% of an opening material, 22 wt.% of water and 3 wt.% of a plasticiser were added. After aging the extrusion was carried out at a plasticity of 26 according to Pfefferkorn. The ceramic carriers were fired for 10 days with a maximum temperature of 1420° C. The average diameter of the secondary pores was about 8,000 nm, the total true porosity 30 Vol.% of the ceramic material, the bulk density 2.10 g/cm$^3$, and the ratio between total true porosity to secondary porosity was about 1:1. The ceramic material consisted of more than 40 wt.% mullite and less than 20 wt.% corundum, as far as could be recognized. No cordierite seemed to be comprised.

As can be seen from the examples a high amount of fine-grained opening material allows a great value of plasticity, that means a relative stiff mass for the extrusion. Thus it was found that with a plasticity of 27 according to Pfefferkorn the mass could still be extruded but was immediately after extrusion strong enough so that the wall between the channels of the extruded structure could be reduced to a thickness of less than 0.5 mm without any deformation of the green clot before firing. The cold crushing strength of produced ceramic carriers originally containing 40 wt.% opening material resulting in 56 Vol.% pore volume was about 6 N/mm$^2$ related to the total cross-section which is about the same as that of some lightweight refractory stones without channels.

Although it is stated that the channels have preferably a square cross-section with the length of the square ranging from 8 to 10 times the thickness of the walls between the channels, the length of the square may be in the range of 8 to 12 times the thickness of the walls between the channels. Similarly, it is stated that the square length q of a channel is 8 to 10 times the thickness k of an inner wall. This square length q of the channel may be 8 to 12 times the thickness k of an inner wall.

The invention as described hereinabove in the context of the preferred embodiments is not to be limited to all of the provided details thereof, since modifications and variations thereof may be made without departing from the spirit and scope of the invention.

What is claimed is:

1. A ceramic honeycombed elongated catalyst carrier comprising:
   a plurality of elongated parallel channels extending in a longitudinal direction of said catalyst carrier;
   a plurality of inner walls separating said channels from each other;
   each of said inner walls having a thickness ranging from 0.4 mm to 1.2 mm;
   an outer wall surrounding said channels and said inner walls, defining a total cross-sectional area of said catalyst carrier;
   each of said channels having a square cross section with a length of a side ranging from 8 to 12 times said thickness of said inner walls;
   a total open cross-sectional area of said square cross sections of said plurality of channels which is greater than 80% of said total cross-sectional area of said catalyst carrier;
   said ceramic forming said inner walls and said outer walls having a total true porosity ranging from 30% to 70%;
   said total true porosity being formed by a primary porosity and a secondary porosity;
   said secondary porosity being caused by an organic opening material;
   said total porosity having a ratio to said secondary porosity ranging from 1:1 to 6:1; and
   said secondary porosity being characterized by an unsymmetrical bell-shaped distribution curve with negative skewness, a relative amount of volume of secondary pores forming said secondary porosity in said ceramic versus secondary pore diameters, where a modal value ranges from 4,000 nm to 60,000 nm, with substantially no secondary pores below 0.1 times said modal value and with less than 5% to 10% of said secondary pores greater than 6.0 times said modal value.

2. A ceramic catalyst carrier as recited in claim 1 comprising a length ranging from 300 mm to 2,500 mm and a rectangular cross-section with a length of an edge ranging from 100 mm to 300 mm.

3. A ceramic catalyst carrier as recited in claim 1 wherein said ceramic comprises cordierite with said primary porosity ranging from 10% to 20%.

4. A ceramic catalyst carrier as recited in claim 1 wherein said ceramic comprises mullite with said primary porosity ranging from 4% to 12%.

5. A ceramic catalyst carrier as recited in claim 1 wherein said ceramic comprises stone ware.

6. A ceramic catalyst carrier carrier as recited in claim 1 wherein said ceramic comprises a mixture of cordierite, mullite and stone ware.

7. A ceramic catalyst carrier as recited in claim 1 further comprising:
   anorganic fibres in said ceramic forming said inner and outer walls wherein said fibres have a length ranging from 0.5 mm to 50 mm and a thickness ranging from 0.002 mm to 0.02 mm, with an amount of said fibres ranging from 3 wt.% to 5 wt.% of said ceramic.

8. A ceramic catalyst carrier as recited in claim 7 wherein said anorganic fibres are made of rock wool, cordierite or mullite.

9. A ceramic catalyst carrier as recited in claim 8 wherein said anorganic fibres are made of glass which is at least one of partly and completely resorbed by said ceramic during firing.

10. A ceramic catalyst carrier as recited in claim 9 wherein a diameter of primary pores forming said primary porosity is less than 0.1 times said modal value of said distribution curve and is essentially in a range of 10 nm to 3,000 nm.

11. A ceramic catalyst carrier as recited in claim 10 wherein said ratio of said total true porosity to said secondary porosity ranges from 1:1 to 2:1.

12. A ceramic catalyst carrier as recited in claim 1 wherein said inner and outer walls have a bulk density of 1.0 g/cm$^3$ to 1.8 g/cm$^3$ and wherein said total true porosity is ranging from 50% to 70%.

* * * * *